United States Patent
Edsö et al.

(10) Patent No.: US 10,552,307 B2
(45) Date of Patent: Feb. 4, 2020

(54) STORING ARRAYS OF DATA IN DATA PROCESSING SYSTEMS

(71) Applicant: ARM Limited, Cambridge (GB)

(72) Inventors: Tomas Fredrik Edsö, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/616,510

(22) Filed: Jun. 7, 2017

(65) Prior Publication Data

US 2017/0357570 A1  Dec. 14, 2017

(30) Foreign Application Priority Data

Jun. 10, 2016  (GB) .................................. 1610131.3

(51) Int. Cl.
*G06F 12/02* (2006.01)
*G06F 12/123* (2016.01)

(52) U.S. Cl.
CPC .......... *G06F 12/023* (2013.01); *G06F 12/125* (2013.01)

(58) Field of Classification Search
CPC ............................ G06F 12/023; G06F 12/125
See application file for complete search history.

(56) References Cited

U.S. PATENT DOCUMENTS

| | | | | |
|---|---|---|---|---|
| 5,901,103 A | * | 5/1999 | Harris, II | G11C 5/141 365/201 |
| 6,604,166 B1 | * | 8/2003 | Jana | G06F 12/0207 711/157 |
| 2007/0277003 A1 | * | 11/2007 | Caulk | G06F 12/0607 711/149 |
| 2012/0106287 A1 | | 5/2012 | Catovic | |
| 2015/0285625 A1 | * | 10/2015 | Deane | G01S 17/10 348/140 |

OTHER PUBLICATIONS

GB Combined Search and Examination Report dated Oct. 27, 2016, GB Patent Application No. GB1610131.3.
Shang, et al., "Single-Port SRAM-Based Transpose Memory With Diagonal Data Mapping for Large Size 2-D DCT/IDCT", pp. 2422-2426, IEEE Transactions on Very Large Scale Integration (VLSI) Systems, vol. 22, No. 11, Nov. 2014 (IEEE Service Center, Piscataway, NJ, USA).

* cited by examiner

*Primary Examiner* — Larry T Mackall
(74) *Attorney, Agent, or Firm* — Vierra Magen Marcus LLP

(57) ABSTRACT

In a data processing system that comprises a memory 8 comprising N memory banks 11, a memory controller is configured to store one or more N data unit×N data unit arrays of data in the memory 8 such that each data unit in each row of each N×N data unit array is stored in a different memory bank of the N memory banks 11, and such that each data unit in each column of each N×N data unit array is stored in a different memory bank of the N memory banks 11.

10 Claims, 4 Drawing Sheets

2 bank pattern

A
| 0 | 1 |
|---|---|
| 1 | 0 |

4 bank pattern

B
| 0 | 1 | 2 | 3 |
|---|---|---|---|
| 2 | 3 | 0 | 1 |
| 3 | 2 | 1 | 0 |
| 1 | 0 | 3 | 2 |

C
| 0 | 1 | 2 | 3 |
|---|---|---|---|
| 2 | 3 | 0 | 1 |
| 1 | 0 | 3 | 2 |
| 3 | 2 | 1 | 0 |

9 bank pattern

D
| 0 | 1 | 2 | 3 | 4 | 5 | 6 | 7 | 8 |
|---|---|---|---|---|---|---|---|---|
| 3 | 4 | 5 | 6 | 7 | 8 | 0 | 1 | 2 |
| 6 | 7 | 8 | 0 | 1 | 2 | 3 | 4 | 5 |
| 1 | 2 | 0 | 4 | 5 | 3 | 7 | 8 | 6 |
| 4 | 5 | 3 | 7 | 8 | 6 | 1 | 2 | 0 |
| 7 | 8 | 6 | 1 | 2 | 0 | 4 | 5 | 3 |
| 2 | 0 | 1 | 5 | 3 | 4 | 8 | 6 | 7 |
| 5 | 3 | 4 | 8 | 6 | 7 | 2 | 0 | 1 |
| 8 | 6 | 7 | 2 | 0 | 1 | 5 | 3 | 4 |

2 bank pattern

A
| 0 | 1 |
|---|---|
| 1 | 0 |

4 bank pattern

B
| 0 | 1 | 2 | 3 |
|---|---|---|---|
| 2 | 3 | 0 | 1 |
| 3 | 2 | 1 | 0 |
| 1 | 0 | 3 | 2 |

C
| 0 | 1 | 2 | 3 |
|---|---|---|---|
| 2 | 3 | 0 | 1 |
| 1 | 0 | 3 | 2 |
| 3 | 2 | 1 | 0 |

9 bank pattern

STORING ARRAYS OF DATA IN DATA PROCESSING SYSTEMS

BACKGROUND

The technology described herein relates to data processing systems, and in particular to methods of and apparatus for storing arrays of data in data processing systems.

In data processing systems, it is common for data to be stored and processed as a data array, i.e. an array of plural data positions, where each data position takes a particular data (e.g. colour) value.

In such systems, when an array of data is generated, it will typically be stored in memory, e.g. random access memory (RAM), so as to be available for further processing, display, etc.

It is often desirable to selectively process one or more single (one-dimensional) rows (lines) of an array of data and/or one or more single (one-dimensional) columns of the array. This may be the case, for example, in some image processing techniques, but also more generally in data processing techniques, such as frequency transforms, etc.

The Applicants believe that there remains scope for improvements to data processing systems that operate in this manner.

BRIEF DESCRIPTION OF THE DRAWINGS

Various embodiments of the technology described herein will now be described by way of example only and with reference to the accompanying drawings, in which:

FIG. 3 shows schematically various memory arrangements in accordance with various embodiments.

Like reference numerals are used for like components throughout the drawings, where appropriate.

DETAILED DESCRIPTION

Figure 1:
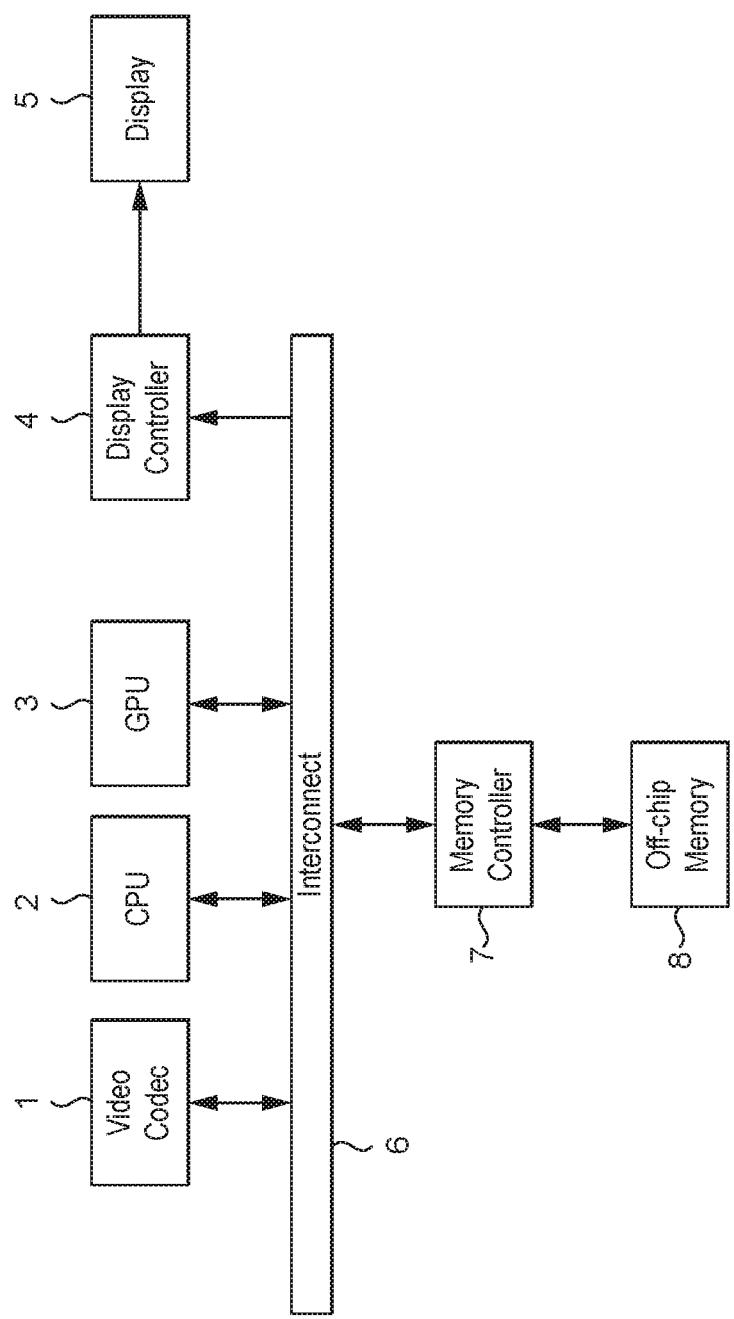
FIG. 1 shows schematically a data processing system that may be operated in accordance with various embodiments of the technology described herein.

A first embodiment of the technology described herein comprises a method of operating a data processing system that comprises a memory comprising N memory banks, the method comprising:

storing one or more N data unit×N data unit arrays of data in the memory such that:

for each row of each N×N data unit array, each data unit of the row is stored in a different memory bank of the N memory banks; and for each column of each N×N data unit array, each data unit of the column is stored in a different memory bank of the N memory banks.

A second embodiment of the technology described herein comprises a data processing system comprising:

a memory for storing one or more arrays of data, the memory comprising N memory banks; and memory storing circuitry configured to store one or more N data unit×N data unit arrays of data in the memory such that:

for each row of each N×N data unit array, each data unit of the row is stored in a different memory bank of the N memory banks; and for each column of each N×N data unit array, each data unit of the column is stored in a different memory bank of the N memory banks.

The technology described herein is concerned with a method of operating a data processing system that comprises an N-bank memory for storing one or more arrays of data. In the technology described herein, one or more N data unit×N data unit arrays of data are stored in the memory such that each data unit in each N data unit row (line) of each N×N data unit array is stored in a different memory bank of the N memory banks to the other data units in the row in question, and such that each data unit in each N data unit column of each N×N data unit array is stored in a different memory bank of the N memory banks to the other data units in the column in question.

The Applicants have found that storing N×N data unit arrays in an N-bank memory in this way results in a particularly efficient arrangement for reading and/or writing rows and columns of the data array from or to the memory. In particular, this arrangement means that when reading and/or writing a row (line) or column of data of an N×N data unit array from or to the memory, each of the N memory banks need only be accessed once. Accordingly, the row (line) or column of data units may be read from and/or written to the memory in a single clock cycle, e.g. by accessing each of the N memory banks in parallel.

In addition, this arrangement means that the read and/or write operations in respect of rows and columns of the N×N data unit array are "symmetrical", i.e. require the same or similar resources. As will be explained more fully below, this provides a particularly efficient arrangement where it is desired to selectively process (e.g. read and/or write) rows and/or columns of data, such as in some image processing techniques, and more generally in data processing techniques, such as frequency transforms, etc.

It will be appreciated, therefore, that the technology described herein provides an improved method of operating a data processing system and an improved data processing system.

The memory of the technology described herein may comprise any suitable and desired memory for storing one or more arrays of data.

The memory may be or may comprise a memory that is on-chip with and/or local to other processing stages of the data processing system, or may be a (standalone) "external" memory.

In one embodiment, the "banked" memory is on-chip with and/or local to a processing stage of the data processing system, such as, and in an embodiment, a graphics processor (GPU), video processor (VPU), display controller, and/or display, etc., of the data processing system. In another embodiment, the memory is an external memory, such as a main memory of the data processing system.

In an embodiment, the memory comprises a random access memory (RAM), in an embodiment a static random access memory (SRAM). It would also be possible for the memory to comprise a dynamic random access memory (DRAM).

The memory may be dedicated memory for storing one or more arrays of data, or it may be part of a memory that is used for other data as well. In an embodiment, the memory is or comprises a frame buffer for storing one or more arrays of (image) data (e.g. frames).

The memory may comprise any (plural) number N of memory banks. In one embodiment, the memory comprises two banks. In another embodiment, the memory comprises $n^2$ banks (i.e. $N=n^2$), where n is a positive integer greater than 1 (i.e. n=2, 3, 4, 5 ...). Thus, for example, the memory may comprise 2, 4, 9, 16, etc., banks. Other arrangements would be possible.

The memory may be divided into the plural memory banks in any suitable and desired manner. The division of the memory into at least some or all of the N memory banks may be a logical division. Additionally or alternatively, the division the memory into at least some or all of the N memory banks may be a physical division.

In one embodiment, two or more or all (and in an embodiment all) of the N memory banks are provided as or on a single chip (monolithic integrated circuit), e.g. where the or each chip is logically divided into plural memory banks. In this case they are in an embodiment "on-chip" with a processor or processing stage of the data processing system, such as a VPU, GPU, CPU, etc.

In another embodiment, one or more or each memory bank is provided as or on its own separate chip (monolithic integrated circuit). In an embodiment, each of the N memory banks is provided on or as its own (separate) chip (monolithic integrated circuit).

Each memory bank in an embodiment comprises its own input/output port, i.e. via which data can be read from and/or written to the memory bank. In an embodiment, each memory bank comprises a single port. The provision of a single input/output port per bank reduces the complexity and power requirements of the memory.

In the technology described herein, the or each N×N array of data that is or that is to be stored in the memory may comprise any suitable and desired such array of data. There may be a single N×N array of data that is or that is to be stored in the memory, or there may be plural N×N arrays of data that is or that is to be stored in the memory.

The or each N×N array of data comprises an N×N array of data units, with each data unit having one or more particular data values. Thus, each N×N array of data should (and in an embodiment does) comprise N rows of data units, where each row comprises N data units, and N columns of data units, where each column comprises N data units.

The data (values) may comprise any suitable and desired data (values), but in an embodiment comprise image data, i.e. one or more arrays of image (colour) data, or otherwise. Correspondingly, the or each N×N array may comprise or may form part of any suitable and desired array that may be generated by a data processing system, such as a render output, tile, frame, texture, etc. Other arrangements would be possible.

The or each N×N array of data can be generated as desired. In an embodiment, each N×N array is generated by a data processor or a processing stage of the data processing system. For example, one or more or each N×N array may be generated by being appropriately rendered by a graphics processing system (a graphics processor). Additionally or alternatively, one or more or each N×N array may be generated by being appropriately decoded by a video codec or other decoder. Additionally or alternatively, one or more or each N×N array may be generated by being appropriately encoded by a video codec or other encoder. Additionally or alternatively, one or more or each N×N array may be generated by a digital camera image signal processor (ISP), or other image processor. It would also be possible for a display controller, a central processing unit (CPU) or another data processor to generate the or each N×N data array.

An N×N data array that is stored (and processed) in the manner of the technology described herein may comprise the entire data array (e.g. render output, tile, frame, texture, etc.) in question (e.g. that is generated (and/or processed) by the processing stage in question and/or the data processing system).

Alternatively, the or each N×N data array that is stored (and processed) in accordance with the technology described herein may comprise less than the entire data array (e.g. render output, tile, frame, texture, etc.) in question (e.g. that is generated (and/or processed) by the processing stage in question and/or the data processing system) (and in an embodiment this is the case). Thus, in an embodiment, each N×N data array comprises a sub-region of an overall data array (e.g. render output, tile, frame, texture, etc.), e.g. that is generated (and processed) by the processing stage in question and/or by the data processing system.

In this case, the other (sub-)regions of the overall data array (e.g. render output, tile, frame, texture, etc.) may be stored in the memory as desired. However, in an embodiment, the other (sub-)regions of the overall data array are stored in accordance with the technology described herein. In an embodiment, an overall data array (e.g. render output, tile, frame, texture, etc.) is divided into plural N data unit×N data unit arrays, and each N×N data unit array is stored in accordance with the technology described herein. In this case, the overall data array may be divided into N×N data unit arrays as desired, but in an embodiment each N×N data unit array comprises a different part (sub-region) of the overall data array.

The or each N data unit×N data unit array may have any suitable and desired size (so long as the number of rows and the number of columns in each array is equal to the number of memory banks). Thus, in one embodiment, N=2. In another embodiment, $N=n^2$, where n is a positive integer greater than 1 (i.e. n=2, 3, 4, 5 ...). Thus, for example, the or each N×N array may comprise a 2×2, 4×4, 9×9, 16×16, etc. array of data units. Other arrangements would be possible.

Each data unit of the or each N×N array may comprise any suitable and desired unit of data.

In one embodiment, each data unit comprises a single data position (e.g. sampling position), e.g. of the overall data array, i.e. with each data position (e.g. sampling position) taking a particular data value. Alternatively, each data unit may comprise plural data positions (e.g. sampling positions) (a group of plural data positions (e.g. sampling positions)), e.g. of the overall data array.

In this latter case, each group of plural data positions (e.g. sampling positions) may comprise any plural number of data positions and may be configured as desired. Each group of plural data positions (e.g. sampling positions) in an embodiment comprises a contiguous set of plural data positions of the data array in question. Each group is in an embodiment a rectangular, in an embodiment square group, and thus in an embodiment comprises the same number of columns and rows (but this is not necessary). For example, each group (data unit) may comprise a 2×1 group of data positions, a 2×2 group of data positions, a 2×3 group of data positions, a 4×4 group of data positions, etc. Other arrangements would be possible.

As discussed above, in the technology described herein one or more N×N arrays of data units are stored in the memory such that each data unit in each row of each N×N data unit array is stored in a different memory bank of the N memory banks, and such that each data unit in each column of each N×N data unit array is stored in a different memory bank of the N memory banks.

In an embodiment, the one or more N data unit×N data unit arrays of data are stored in the memory such that as well as each data unit of each row being stored in a different memory bank of the N memory banks and each data unit of each column being stored in a different memory bank of the N memory banks, each data unit in one or more $\sqrt{N}$ data unit×$\sqrt{N}$ data unit blocks (sub-arrays) of each N×N data unit array is stored in a different memory bank of the N memory banks to the other data units of the $\sqrt{N}\times\sqrt{N}$ block of data units. Thus, in a particular embodiment, the or each N data unit×N data unit array is stored in the memory such that for one or plural $\sqrt{N}\times\sqrt{N}$ data unit blocks of the N×N data unit array, each data unit of the block is stored in a different memory bank of the N memory banks.

Storing one or more data arrays in an N-bank memory in this way results in a particularly efficient arrangement for reading and/or writing rows, columns and $\sqrt{N}\times\sqrt{N}$ blocks of data units from or to the memory. In particular, this arrangement means that when reading and/or writing a row, column or $\sqrt{N}\times\sqrt{N}$ block of data units of an N×N data unit array from or to the memory, each of the N memory banks need only be accessed once. Accordingly, the row, column or block of data units may be read from and/or written to the memory in a single clock cycle, e.g. by accessing each of the N memory banks in parallel.

This arrangement also means that the read and/or write operations in respect of rows, columns and $\sqrt{N}\times\sqrt{N}$ blocks of the N×N data array are "symmetrical", i.e. require the same or similar resources, and therefore provides a particularly efficient arrangement where it is desired to selectively process (e.g. read and/or write) rows, columns and/or blocks of data units, such as in some image processing techniques, and more generally in data processing techniques, such as frequency transforms, etc.

In these embodiments, a single $\sqrt{N}\times\sqrt{N}$ data unit block of the or each N×N array of data units may be stored in the memory such that each data unit of the block is stored in a different memory bank of the N memory banks, or in an embodiment, the or each N×N array of data is stored in the memory such that plural $\sqrt{N}\times\sqrt{N}$ data unit blocks of each N×N data unit array are stored in this way.

In these embodiments, each $\sqrt{N}\times\sqrt{N}$ block of data units in an embodiment represents a particular (sub-)region ((sub-)area) of the N×N array of data units. Each block should (and in an embodiment does) comprise a (two-dimensional) sub-array of the N×N array of data units. Each block should, and in an embodiment does, comprise at least two rows of data units and at least two columns of data units of the N×N array.

The sub-division of the or each N×N array into $\sqrt{N}\times\sqrt{N}$ blocks of data units can be done as desired, and each $\sqrt{N}\times\sqrt{N}$ data unit block can represent any suitable and desired region (area) of the overall N×N array. In an embodiment, the or each block comprises a regularly sized and shaped $\sqrt{N}\times\sqrt{N}$ region of the N×N array, in an embodiment a rectangular, in an embodiment square, region.

In one embodiment, each block comprises a different part (sub-region) of the N×N array. In another embodiment at least some of the blocks overlap.

Each $\sqrt{N}\times\sqrt{N}$ data unit block may comprise any desired set of N data units of the N data unit×N data unit array, and each N×N array of data may be divided into plural $\sqrt{N}\times\sqrt{N}$ blocks of data units as desired.

In an embodiment, each N×N array of data is effectively divided into $\sqrt{N}$ contiguous groups of $\sqrt{N}$ rows, and into $\sqrt{N}$ contiguous groups of $\sqrt{N}$ columns. That is, each N×N array of data units is effectively divided into $\sqrt{N}$ rows of $\sqrt{N}$ data unit blocks and into $\sqrt{N}$ columns of $\sqrt{N}$ data unit blocks (where each block of data comprises a $\sqrt{N}$ data unit×$\sqrt{N}$ data unit array of data units).

In this case, only some of the blocks in each group of rows (each row of blocks) may be stored in accordance with the technology described herein and/or only some of the blocks in each group of columns (each column of blocks) may be stored in accordance with the technology described herein. For example, in one embodiment, each of the ($\sqrt{N}$) non-overlapping blocks in each group of rows (each row of blocks) is stored in accordance with the technology described herein and/or each of the ($\sqrt{N}$) non-overlapping blocks in each group of columns (each column of blocks) is stored in accordance with the technology described herein. In this case, there will be (at least) $\sqrt{N}\times\sqrt{N}$ non-overlapping blocks of data units (where each block of data comprises a $\sqrt{N}$ data unit×$\sqrt{N}$ data unit array of data units) stored in accordance with the technology described herein.

However, it would also be possible for some or all of the "intermediate" $\sqrt{N}\times\sqrt{N}$ data unit blocks to be stored in accordance with the technology described herein. That is, some or all of the plural blocks of data units that are stored in accordance with the technology described herein may overlap. In these embodiments, more than $\sqrt{N}\times\sqrt{N}$ blocks of data units (where each block of data comprises a $\sqrt{N}$ data unit×$\sqrt{N}$ data unit array of data units) will be stored in accordance with the technology described herein.

In one such embodiment, each of the (N−$\sqrt{N}$+1) overlapping blocks in each group of rows (each row of blocks) (and correspondingly each of the N overlapping blocks in each group of rows (each row of blocks) when taking into account blocks that "wrap" around the edge) is stored in accordance with the technology described herein, and/or each of the (N−$\sqrt{N}$+1) overlapping blocks in each group of columns (each column of blocks) (and correspondingly each of the overlapping blocks in each group of columns (each column of blocks) when taking into account blocks that "wrap" around the edge) (where each block of data comprises a $\sqrt{N}$ data unit×$\sqrt{N}$ data unit array of data units) is stored in accordance with the technology described herein.

Other arrangements would be possible.

Although the technology described herein has been described above primarily in terms of storing one or more N×N data unit arrays in an N-bank memory, it will be appreciated that the technology described herein also extends to the storing (writing) of individual rows (lines), columns, and blocks of data units.

Thus, another embodiment of the technology described herein comprises a method of operating a data processing system that comprises a memory comprising N memory banks, the method comprising:

selectively storing one or more rows and/or one or more columns of an N data unit×N data unit array in the memory;

wherein storing a row of the N data unit×N data unit array comprises storing each data unit of the row in a different memory bank of the N memory banks; and wherein storing a column of the N×N data array comprises storing each data unit of the column in a different memory bank of the N memory banks.

Another embodiment of the technology described herein comprises a data processing system comprising:

a memory for storing one or more arrays of data, the memory comprising N memory banks; and memory storing circuitry configured to selectively store one or more rows and/or one or more columns of an N data unit×N data unit array in the memory;

wherein the memory storing circuitry is configured to store a row of an N data unit×N data unit array by storing each data unit of the row in a different memory bank of the N memory banks; and wherein the memory storing circuitry is configured to store a column of an N×N data unit array by storing each data unit of the column in a different memory bank of the N memory banks.

As will be appreciated by those skilled in the art, these embodiments of the technology described herein can and in an embodiment do include one or more, and in an embodiment all, of the optional features of the technology described herein.

Thus, for example, the method in an embodiment comprises selectively storing (and the data processing system is in an embodiment configured to store) one or more rows, one or more columns and/or one or more $\sqrt{N}$ data unit×$\sqrt{N}$ data unit blocks of the N data unit×N data unit array in the memory, wherein storing a $\sqrt{N}$ data unit×$\sqrt{N}$ data unit block of the N×N data array in an embodiment comprises storing each data unit of the $\sqrt{N}$×$\sqrt{N}$ block in a different memory bank of the N memory banks.

The or each N×N array, row, column and/or block may be stored in the memory by (and the memory storing circuitry may comprise or may be part of) any suitable and desired data processor or processing stage of the data processing system. In an embodiment, the or each N×N array, row, column and/or block is stored in the memory by (and the memory storing circuitry comprises) a memory controller, e.g. for the memory.

In one embodiment, the data processor or processing stage of the data processing system that generates the N×N array, row, column and/or block stores the array, row, column and/or block in the memory (or causes the memory controller to store the array, row, column and/or block in the memory). Thus, in various embodiments, a graphics processing system (a graphics processor), a video codec, a decoder, an encoder, a digital camera image signal processor (ISP) or other image processor, a display controller, a central processing unit (CPU) or another data processor is configured to store the or each N×N data array, row, column and/or block in the memory (or to cause the memory controller to store the array, row, column and/or block in the memory) in accordance with the technology described herein.

Additionally or alternatively, the data processing system (e.g. the memory controller) may (and in an embodiment does) comprise processing circuitry configured to interpret memory write requests in respect of one or more N×N data unit arrays, N data unit rows, columns and/or blocks to be written to the memory (e.g. from a data processor or processing stage of the data processing system), and to cause the one or more N×N data unit arrays, N data unit rows, columns and/or blocks to be stored in the memory in accordance with the technology described herein.

In an embodiment, a set of parameters is specified in respect of a write operation (e.g. by the data processor or processing stage of the data processing system in question), and the processing circuitry (e.g. memory controller) is configured to determine how to write the data to the N-bank memory (in accordance with the technology described herein) based on the set of parameters, and to then write the data to the N-bank memory in the determined manner. In these embodiments, the set of parameters may include, for example, information indicative of a shape (which e.g. could be row, column or block), a logical address (which e.g. could be a column and/or row index), and/or a size (which e.g. could be an entire row, column or block, or less than an entire row column or block). Other arrangements would be possible.

In an embodiment, the step of storing one or more N data unit×N data unit arrays, N data unit rows, columns and/or blocks in the memory comprises writing (and the data processing system is configured to write) one or more N data unit×N data unit arrays, or N data unit rows, columns and/or blocks to the memory in an embodiment by:

for each row of each N×N data unit array, writing each data unit of the row to a different memory bank of the N memory banks;

for each column of each N×N data unit array, writing each data unit of the column to a different memory bank of the N memory banks; and/or for one or more $\sqrt{N}$ data unit×$\sqrt{N}$ data unit blocks of each N×N data array, writing each data unit of the block to a different memory bank of the N memory banks.

In an embodiment, storing (writing) a row (line) of data to the memory comprises writing data to each of the N memory banks in parallel, e.g. at the same time, in an embodiment during a single clock cycle. In an embodiment, storing (writing) a column of data to the memory comprises writing data to each of the N memory banks in parallel, e.g. at the same time, in an embodiment during a single clock cycle. In an embodiment, storing (writing) a block of data to the memory comprises writing data to each of the N memory banks in parallel, e.g. at the same time, in an embodiment during a single clock cycle.

It will be appreciated that the technology described herein also extends to read operations (i.e. reading data from the memory) as well as write operations (writing data to the memory). For example, the stored data array or arrays may be (and in an embodiment are) subsequently read from the N-bank memory.

Thus, in an embodiment, the method comprises reading (and the data processing system is configured to read) one or more rows of a or the N×N data array by reading each data unit of the or each row from a different memory bank of the N memory banks.

In an embodiment, the method comprises reading (and the data processing system is configured to read) one or more columns of a or the N×N data array by reading each data unit of the or each column from a different memory bank of the N memory banks.

In an embodiment, the method comprises reading (and the data processing system is configured to read) one or more $\sqrt{N}$ data unit×$\sqrt{N}$ data unit blocks of a or the N×N data array by reading each data unit of the or each $\sqrt{N}$×$\sqrt{N}$ block from a different memory bank of the N memory banks.

The method in an embodiment comprises selectively reading (and the data processing system is in an embodiment configured to selectively read) one or more rows of a or the N×N data array, one or more columns of a or the N×N data array and/or one or more $\sqrt{N}$×$\sqrt{N}$ blocks of a or the N×N data array in this manner. As discussed above, a particular advantage of the technology described herein is that each of these operations is "symmetrical", and can each be performed in a single clock cycle.

It is believed that the reading of data that is stored in accordance with the technology described herein is new and advantageous in its own right.

Thus, an embodiment of the technology described herein comprises a method of operating a data processing system that comprises a memory comprising N memory banks, the method comprising:

selectively reading one or more rows and/or one or more columns of an N data unit×N data unit array that is stored in the memory;

wherein reading a row of the N data unit×N data unit array comprises reading each data unit of the row from a different memory bank of the N memory banks; and wherein reading a column of the N×N data array comprises reading each data unit of the column from a different memory bank of the N memory banks.

Another embodiment of the technology described herein comprises a data processing system comprising:

a memory for storing one or more arrays of data, the memory comprising N memory banks; and memory reading circuitry configured to selectively read one or more rows and/or one or more columns of an N data unit×N data unit array that is stored in the memory;

wherein the memory reading circuitry is configured to read a row of an N data unit×N data unit array by reading each data unit of the row from a different memory bank of the N memory banks; and wherein the memory reading circuitry is configured to read a column of an N×N data unit array by reading each data unit of the column from a different memory bank of the N memory banks.

As will be appreciated by those skilled in the art, these embodiments of the technology described herein can and in an embodiment do include one or more, and in an embodiment all, of the optional features of the technology described herein.

Thus, for example, the method in an embodiment comprises selectively reading (and the data processing system is in an embodiment configured to read) one or more rows, one or more columns and/or one or more $\sqrt{N}$ data unit×$\sqrt{N}$ data unit blocks of the N data unit×N data unit array that is stored in the memory, wherein reading a $\sqrt{N}$ data unit×$\sqrt{N}$ data unit block of the N×N data unit array in an embodiment comprises reading each data unit of the or each $\sqrt{N}\times\sqrt{N}$ block from a different memory bank of the N memory banks.

In an embodiment, reading a row (line) of data from the memory comprises reading data from each of the N memory banks in parallel, e.g. at the same time, in an embodiment during a single clock cycle. In an embodiment, reading a column of data from the memory comprises reading data from each of the N memory banks in parallel, e.g. at the same time, in an embodiment during a single clock cycle. In an embodiment, reading a block of data from the memory comprises reading data from each of the N memory banks in parallel, e.g. at the same time, in an embodiment during a single clock cycle.

In one embodiment, the data processor or processing stage of the data processing system that reads the one or more N×N arrays, rows, columns and/or blocks of the or each N×N array is configured to read the one or more N×N arrays, rows, columns and/or blocks of the or each N×N array (and comprises the memory reading circuitry or is configured to cause the memory controller to read the one or more N×N arrays, rows, columns and/or blocks of the or each N×N array) in accordance with the technology described herein.

In an embodiment, the memory reading circuitry comprises or forms part of a memory controller, e.g. for the memory.

Additionally or alternatively, the data processing system (e.g. the memory controller) may (and in an embodiment does) comprise processing circuitry configured to interpret memory read requests in respect of N×N data unit arrays, N data unit rows, columns and/or blocks of the one or more N×N data arrays to be read from the memory (e.g. issued by a data processor or processing stage of the data processing system), and to cause the one or more N×N data unit arrays, N data unit rows, columns and/or blocks to be read from the memory in accordance with the technology described herein.

In an embodiment, a set of parameters is specified in respect of a read operation (e.g. by the data processor or processing stage of the data processing system in question), and the processing circuitry (e.g. memory controller) is configured to determine how to read the data from the N-bank memory (in accordance with the technology described herein) based on the set of parameters, and to then read the data from the N-bank memory in the determined manner. In these embodiments, the set of parameters may include, for example, information indicative of a shape (which e.g. could be row, column or block), a logical address (which e.g. could be a column and/or row index), and/or a size (which e.g. could be an entire row, column or block, or less than an entire row column or block). Other arrangements would be possible.

The one or more N×N arrays, rows, columns and/or blocks of the or each N×N array that are read from the N-bank memory may be read from the memory by any suitable and desired data processor or processing stage of the data processing system. The data processor or processing stage of the data processing system may then process the one or more read N×N arrays, rows, columns and/or blocks in any suitable and desired manner.

In an embodiment, one or more $\sqrt{N}$ data unit×$\sqrt{N}$ data unit blocks of a N×N data array are read in accordance with the technology described herein, one or more block based processing operations are performed using the or more read $\sqrt{N}\times\sqrt{N}$ data unit blocks (such as, e.g. scaling, filtering, etc.), and then a suitable output (e.g. one or more processed blocks) is provided by the data processing system.

In an embodiment, one or more N data unit rows of a N×N data array are read in accordance with the technology described herein, one or more row based processing operations are optionally performed using the or more read N data unit rows (such as, e.g. rotation, etc.), and then a suitable output (e.g. one or more (optionally processed) rows of data) is provided by the data processing system, e.g. to a display.

In an embodiment, one or more N data unit columns of a N×N data array are read in accordance with the technology described herein, one or more column based processing operations are performed using the or more read N data unit columns (such as, e.g. rotation, etc.), and then a suitable output (e.g. one or more processed (rotated) columns of data) is provided by the data processing system, e.g. to a display.

Thus for example, in an embodiment, a render output, tile, frame, texture, or other graphics data array is stored in the N-bank memory in accordance with the technology described herein, and the method comprises a graphics processing system (a graphics processor) (selectively) reading (and the graphics processing system (graphics processor) is configured to (selectively) read) one or more N×N arrays, rows, columns and/or blocks of the render output, tile, frame, texture, etc., stored in the memory. The graphics processing system (graphics processor) may then process the read data, e.g. by subjecting the data to one or more graphics processing operations, as desired. The graphics processing system may perform any suitable and desired graphics processing operation, such as rotation, scaling, filtering, (frequency) transforms, etc.

In an embodiment, one or more blocks of encoded video data are stored in the N-bank memory in accordance with the technology described herein, and the method comprises a video codec or other decoder reading (and the video codec or other decoder is configured to read) one or more blocks of encoded video data stored in the memory. The video codec or other decoder may then decode the blocks of encoded video data, as appropriate.

In an embodiment, one or more blocks of video data are stored in the N-bank memory in accordance with the technology described herein, and the method comprises a video codec or other encoder reading (and the video codec or other encoder is configured to read) one or more blocks of video data stored in the memory. The video codec or other encoder may then encode the blocks of video data, as appropriate.

In an embodiment, an array of image data is stored in the N-bank memory in accordance with the technology described herein, and the method comprises a digital camera image signal processor (ISP) or other image processor (selectively) reading (and the digital camera image signal processor (ISP) or other image processor is configured to (selectively) read) one or more N×N arrays, rows, columns and/or blocks of image data stored in the memory. The digital camera image signal processor (ISP) or other image processor may then process the read data as desired, e.g. by subjecting the data to one or more image processing operations. The image processor may perform any suitable and desired image processing operation, such as rotation, scaling, filtering, (frequency) transforms, etc.

In an embodiment, the method comprises a display controller reading (and the display controller is configured to read) one or more rows of image data stored in the memory. The display controller may then provide the rows of data to a display, as appropriate.

In an embodiment, the method comprises a display controller reading (and the display controller is configured to read) one or more columns of image data stored in the memory. The display controller may then rotate the columns of image data to provide one or more rows of data, and then provide the one or more rows of data to a display, as appropriate.

In an embodiment, the method comprises a central processing unit (CPU) or other data processor (selectively) reading (and the display controller is configured to (selectively) read) one or more N×N arrays, rows, columns and/or blocks of a data array stored in the memory. The central processing unit (CPU) or other data processor may then process the read data as desired, e.g. by subjecting the data to one or more data processing operations. The CPU may perform any suitable and desired data processing operation, such as rotation, scaling, filtering, (frequency) transforms, etc.

In an embodiment, less than an entire N data unit row (line), column and/or block may be (and in an embodiment is) stored (written) and/or read to and/or from the memory. In this case one or more banks of the N banks (e.g. that are not (that are other than) required in respect of the read and/or write operation) may be and are in an embodiment de-activated. This may be achieved, for example, by de-selecting the one or more banks of the memory in question. This has the effect of reducing the power consumption of the overall data processing system.

In some embodiments, the data processing system comprises, and/or is in communication with, one or more memories and/or memory devices that store the data described herein, and/or store software for performing the processes described herein. The data processing system may also be in communication with and/or comprise a host microprocessor, and/or with and/or comprise a display for displaying images based on the data generated by the data processing system.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry (hardware) that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system can otherwise include any one or more or all of the usual functional units, etc., that data processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

An embodiment of the technology described herein will now be described with reference to the Figures.

FIG. 1 shows schematically a data processing system in accordance with an embodiment of the present embodiment. It should be noted here that FIG. 1 is only schematic and that, for example, the data processing system will in practice comprise additional processing stages and elements.

The data processing system of FIG. 1 comprises a video codec 1, a central processing unit (CPU) 2, a graphics processing unit (GPU) 3, a display controller 4 and a memory controller 7. As shown in FIG. 1, these communicate via an interconnect 6 and have access to off-chip main memory 8.

The video codec 1, CPU 2, and/or the GPU 3 are operable, inter alia, to generate arrays of output data and to store them, via the memory controller 7, in the off-chip memory 8. The video codec 1, CPU 2, and/or GPU 3 are also operable to read data array(s) from the off-chip memory 8 via the memory controller 7 and process the read data. The video codec 1, CPU 2, and/or GPU 3, may write the processed data back to the memory 8 or otherwise.

For example, the video codec 1 is operable to read one or more blocks of encoded video data stored in the memory 8, to decode the blocks of encoded video data, and to write the decoded blocks of data back to the memory 8. The video codec 1 may also be operable to read one or more blocks of video data stored in the memory 8, to encode the blocks of video data, and to write the encoded blocks of data back to the memory 8.

The CPU 2 is operable to selectively read one or more rows, columns and/or blocks of a data array stored in the memory 8, to then subject the data to one or more data processing operations, and to write the processed data back to the memory 8.

The GPU 3 is operable to selectively read one or more rows, columns and/or blocks of a render output, tile, frame, texture, etc., stored in the memory 8, to then subject the data to one or more graphics processing operations such as rotation, filtering, transforms, etc., and to write the processed data back to the memory 8.

A digital camera image signal processor (ISP) or other image processor (not shown) may also be provided that may be operable to selectively read one or more rows, columns and/or blocks of image data stored in the memory 8, to subject the data to one or more image processing operations, such as rotation, filtering, transforms, etc., and to write the processed data back to the memory 8 or otherwise.

The display controller 4 is operable to read one or more rows (lines) of image data stored in the memory 8, and then provide the rows of data to the display 5.

In the present embodiment, the memory 8 of the data processing system comprises a plural number N of memory banks. This is shown in FIG. 2.

Figure 2:
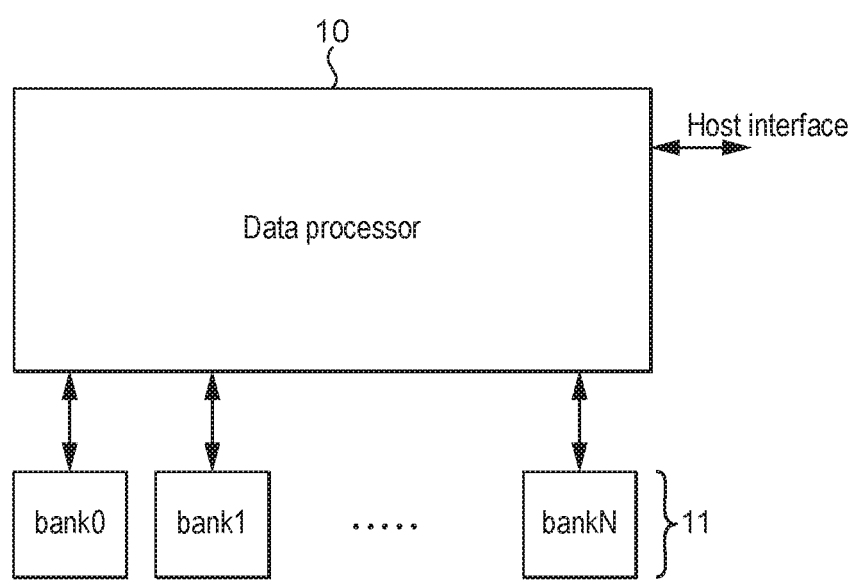
FIG. 2 shows schematically a data processing system that may be operated in accordance with various embodiments of the technology described herein.

FIG. 2 shows schematically a portion of the data processing system of FIG. 1. FIG. 2 shows an exemplary data processor 10 of the system that communicates with the plural memory banks 11 of the memory 8. The data processor 10 may also communicate with a host processor via a host interface, e.g. via AXI or APB or another bus protocol.

The data processor 10 illustrated in FIG. 2 may be any of the video codec 1, CPU 2, GPU 3, or display controller 4 of FIG. 1, or may be an ISP, a decoder, encoder, an image processor, etc.

In the present embodiment, the data processor 10 may selectively request data for processing in the form of one or more rows (lines), columns and/or blocks. The data processor 10 may perform a processing operation using the read data, such as an operation that uses 2D filtering (e.g. FFT/DCT/sub-pixel interpolation, etc.).

As shown in FIG. 2, the memory 8 of the data processing system comprises N memory banks 11. Any plural number of memory banks may be provided and used, such as 2, 4, 9, 16, etc. memory banks.

In the present embodiment, the memory banks are provided on the same chip (monolithic integrated circuit) (e.g. as respective on-chip SRAMs). In this case, two or more or each of the memory banks may be logically divided from one another. However, it would also or instead be possible to provide one or more or each memory bank as or on separate chips (monolithic integrated circuits), if desired.

In the present embodiment, each memory bank comprises a single input/output port, e.g. via which the data processor 10 may write data to the memory bank and read data from the memory bank.

In particular, each of the RAM banks may comprise a single-ported SRAM. This has the benefit of not requiring multiport memories, thereby making the arrangement more portable across different libraries, etc. This also provides a smaller (in terms of chip area) and more power efficient arrangement.

N data unit×N data unit arrays of data generated by the data processor 10 are distributed between the plural memory banks 11 such that each data unit in each row of each N×N data array is stored in a different memory bank of the N memory banks, and such that each data unit in each column of each N×N data array is stored in a different memory bank of the N memory banks. In some embodiments, the N data unit×N data unit arrays generated by the data processor 10 are also distributed between the plural memory banks 11 such that each data unit in one or plural √N data unit×√N data unit blocks of each N×N data unit array are stored in a different memory bank of the N memory banks.

This is illustrated by FIG. 3. In FIG. 3, each square in each of the illustrated data arrays represents a data unit of the overall data array. Each data unit may comprise a single data position or plural data positions of the array, with each data position having a particular, e.g. colour, value. In FIG. 3, each number indicates which of the plural memory banks that that data unit is or is to be stored in.

FIG. 3A illustrates a memory arrangement in respect of a 2×2 data unit array in accordance with an embodiment. As shown in FIG. 3A, two of the data units are stored in memory bank "0", while the other two are stored in memory bank "1". This arrangement means that when reading and/or writing a row (line) or column of data units of a 2×2 data unit array from or to the memory 8, each of the two memory banks 11 need only be accessed once. Accordingly, the row (line) or column of data units may be read from and/or written to the memory 8 in a single clock cycle, e.g. by accessing each of the memory banks in parallel. This arrangement also means that the read and/or write operations in respect of rows and columns of the 2×2 data unit array are "symmetrical", i.e. require the same or similar resources.

FIG. 3B illustrates a memory arrangement in respect of a 4×4 data unit array in accordance with an embodiment. As shown in FIG. 3B, four of the data units are stored in memory bank "0", four are stored in memory bank "1", four are stored in memory bank "2", and the remaining four are stored in memory bank "3". Again, this arrangement means that when reading and/or writing a row (line) or column of data units of a 4×4 data unit array from or to the memory 8, each of the four memory banks 11 need only be accessed once. In addition, when reading and/or writing 2×2 blocks of data units from or to the memory 8, each of the four memory banks 11 need only be accessed once. Accordingly, the rows (lines), columns, or 2×2 blocks of data units may be read from and/or written to the memory 8 in a single clock cycle, e.g. by accessing each of the memory banks in parallel. This arrangement also means that the read and/or write operations in respect of rows, columns, and 2×2 blocks of the 4×4 data unit array are "symmetrical", i.e. require the same or similar resources.

In FIG. 3B, four blocks, i.e., the four 2×2 blocks in the corners of the overall 4×4 data unit array, are arranged such that each data unit in each block is stored in a different memory bank of the N memory banks.

However, it would also be possible to arrange the memory such that more 2×2 blocks are arranged in this manner. FIG. 3C illustrates one such embodiment. As shown in FIG. 3C, plural overlapping 2×2 blocks of data units are arranged such that each data unit in each block is stored in a different memory bank of the N memory banks.

FIG. 3D illustrates a memory arrangement in respect of a 9×9 data unit array in accordance with an embodiment. As shown in FIG. 3D, this arrangement again means that when reading and/or writing rows (lines), columns, or 3×3 blocks of data units of the 9×9 data unit array from or to the memory 8, each of the nine memory banks 11 need only be accessed once. Accordingly, rows (lines), columns or 3×3 blocks of data units may be read from and/or written to the memory 8 in a single clock cycle, e.g. by accessing each of the memory banks in parallel. This arrangement also means that the read and/or write operations in respect of rows, columns and 3×3 blocks of the 9×9 data unit array are "symmetrical", i.e. require the same or similar resources.

In the present embodiment, where the overall data array is larger than the N×N pattern in question, then the overall data array may be divided into plural non-overlapping N×N data unit arrays, and each of the N×N data unit arrays may be stored in the N-bank memory in accordance with the N×N pattern in question.

As will be appreciated from the above, the technology described herein provides an efficient scheme for organising a data array memory, and efficient bandwidth, e.g. for both reading and writing rows (lines) and columns, as well as blocks.

An illustrative embodiment will now be described, in which a RAM buffer holds 8-bit samples of an image. The buffer may be selectively accessed (e.g. read) in respect of columns, rows (lines) and blocks. This is common in various image processing techniques, but also in general data processing, such as frequency transforms, etc.

To achieve efficient read and write operations, the RAM buffer is split into a number of banks. In this illustrative embodiment, the RAM is split into four banks which each hold 2×2 samples (=4×8=32 bits). The total bandwidth in respect of reading from or writing to the four RAM banks is accordingly 4×32=128 bits per cycle (16 samples).

In the present illustrative embodiment, the image data is mapped to the RAM buffer as described above with respect to FIG. 3B. Within an 8×8 sample grid, each 2×2 block is assigned to the RAM bank as indicated in FIG. 3B. This "Sudoku" RAM arrangement provides efficient access to 833 2, 2×8 and 4×4 blocks.

As can be seen from FIG. 3B, the memory pattern provides efficient reading and writing of all four physical banks for all consecutive 2×2 blocks in both the horizontal and vertical direction (regardless of "alignment"). For 4×4 blocks, all "aligned" 4×4 blocks can also be efficiently read and written in a single cycle.

Figure 4:
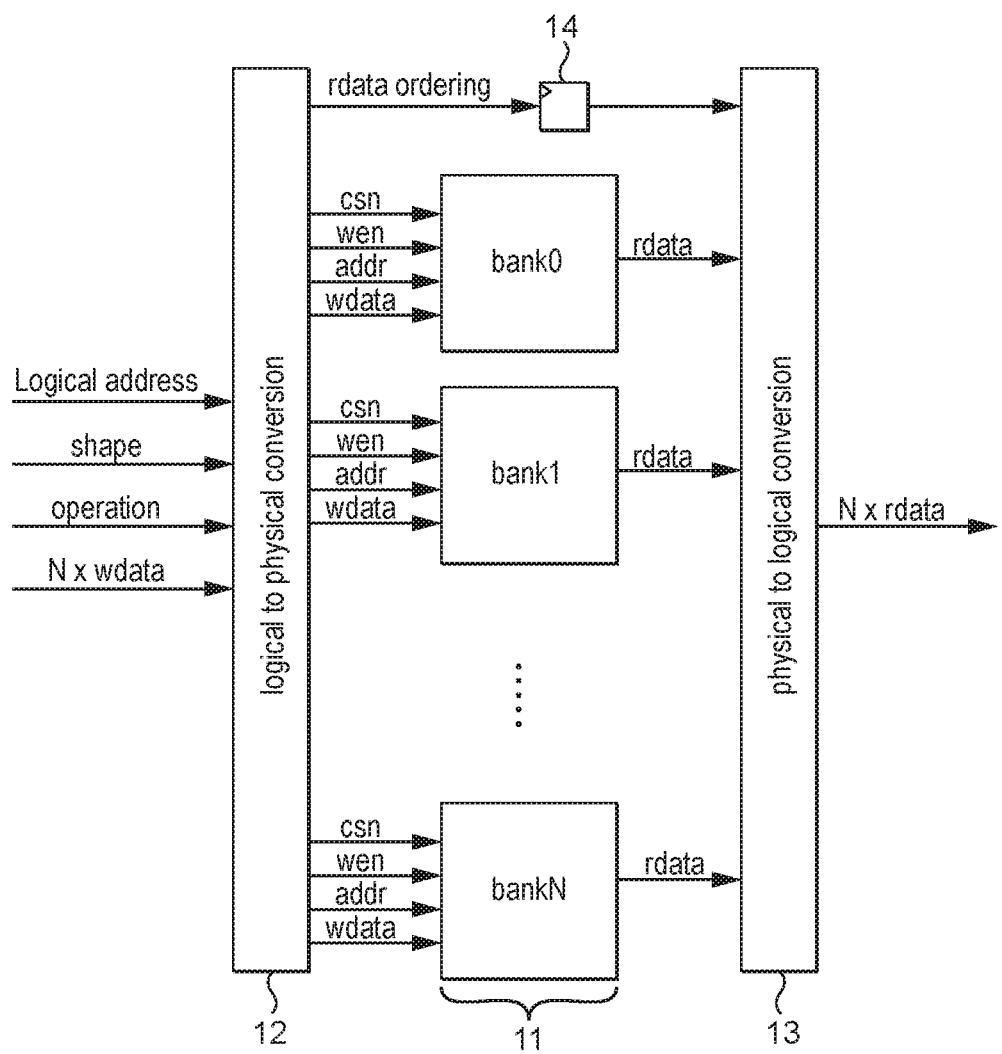
FIG. 4 shows schematically read and write processes in accordance with various embodiments of the technology described herein.

FIG. 4 shows a process for reading and/or writing the data to the plural memory banks in accordance with an embodiment.

An "operation" (for example read or write operation) in respect of a "shape" (which could be, for example, a row, column, or block) at a "logical address" (which could be a column and row number), optionally as well as size (which could be a full row, column or block or less than a full row, column or block) is requested, e.g. by the data processor 10.

A "logical to physical" process (processing circuitry) 12 converts the requested operation into physical addresses in respect of the physical RAMs 11 (i.e. banks). For a write operation, this involves dividing and permutating the write data (wdata) according to the banking pattern, and selecting the appropriate banks (which may be all the banks or less than all the banks, e.g. if the size of the operation is not "full").

For a read operation, the "physical to logical" process (processing circuitry) 13 permutates and recombines data read according to the banking pattern to generate the requested data (according to the shape, logical address, etc.). Information indicating which permutation to use is passed from the "logical to physical" process 12, through a delay register 14, since the "rdata" of the RAM may be generated in the cycle following the read access (for an SRAM).

Although the above embodiments have been described primarily in terms of 2×2, 4×4 and 9×9 data unit arrays, the technology described herein can be generalised to any array size, e.g. by using more banks and/or by storing more data positions (samples) per bank, e.g. so as to fit the requirements of the application in question.

According to various embodiments, for cycles where only a small section or sections of a row (line)/column/block is read or written, then the memory bank chip or chips that are not used can be de-selected, e.g. by de-asserting the chip select signal for the unused banks, thereby saving power.

The present embodiments have been described primarily with reference to the memory banks being in the off-chip memory 8. It would equally be possible for the other processing units of the data processing system, such as the video codec 1, CPU 2, GPU 3, display controller 4 and display 5 to have local, internal, banked memory, and the present embodiments (and technology described herein) can equally be used with such memory, if desired.

It can be seen from the above that embodiments of the technology described herein enable reduction of power consumption within a data processing system, e.g. where it is desired to selectively read and/or write rows, columns and/or blocks of data. This is achieved, in embodiments at least, by storing one or more N data unit×N data unit arrays of data in the memory such that each data unit in each row of each N×N data array is stored in a different memory bank of the N memory banks and such that each data unit in each column of each N×N data array is stored in a different memory bank of the N memory banks.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that comprises a memory comprising N memory banks, wherein $N=n^2$, and wherein n is a positive integer greater than 1, the method comprising:
   storing one or more N data unit×N data unit arrays of data in the memory such that:
   for each row of each N×N data unit array, each data unit of the row is stored in a different memory bank of the N memory banks; and
   for each column of each N×N data unit array, each data unit of the column is stored in a different memory bank of the N memory banks;
   wherein each N×N data array comprises $\sqrt{N}$ rows of $\sqrt{N}$ data unit×$\sqrt{N}$ data unit blocks, and $\sqrt{N}$ columns of $\sqrt{N}$ data unit×$\sqrt{N}$ data unit blocks, and wherein the method comprises storing the one or more N data unit×N data unit arrays of data in the memory such that:
   for each $\sqrt{N}$ data unit×$\sqrt{N}$ data unit block of more than N overlapping $\sqrt{N}$ data unit×$\sqrt{N}$ data unit blocks of each N×N data array, each data unit of the block is stored in a different memory bank of the N memory banks.

2. The method of claim 1, further comprising:
   reading a row of the N×N data unit array by reading each data unit of the row from a different memory bank of the N memory banks;
   reading a column of the N×N data unit array by reading each data unit of the column from a different memory bank of the N memory banks; and/or
   reading a $\sqrt{N}$ data unit×$\sqrt{N}$ data unit block of the N×N data unit array by reading each data unit of the $\sqrt{N}\times\sqrt{N}$ block from a different memory bank of the N memory banks.

3. The method of claim 1, comprising de-activating one or more banks of the N memory banks during a read and/or write operation.

4. The method of claim 1, wherein each $\sqrt{N}$ data unit×$\sqrt{N}$ data unit block comprises at least two rows of data units and at least two columns of data units of the N×N array.

5. The method of claim 1, wherein each $\sqrt{N}$ data unit×$\sqrt{N}$ data unit block comprises at least two rows of data units and at least two columns of data units of the N×N array.

6. A data processing system comprising:
   a memory for storing one or more arrays of data, the memory comprising N memory banks, wherein $N=n^2$, and wherein n is a positive integer greater than 1; and
   one or more memory storing circuits configured to store one or more N data unit×N data unit arrays of data in the memory such that:
   for each row of each N×N data unit array, each data unit of the row is stored in a different memory bank of the N memory banks; and
   for each column of each N×N data unit array, each data unit of the column is stored in a different memory bank of the N memory banks;
   wherein each N×N data array comprises $\sqrt{N}$ rows of $\sqrt{N}$ data unit×$\sqrt{N}$ data unit blocks, and $\sqrt{N}$ columns of $\sqrt{N}$ data unit×$\sqrt{N}$ data unit blocks, and wherein the one or more memory storing circuits are configured to store the one or more N data unit×N data unit arrays of data in the memory such that:
   for each $\sqrt{N}$ data unit×$\sqrt{N}$ data unit block of more than N overlapping $\sqrt{N}$ data unit×$\sqrt{N}$ data unit blocks of each N×N data array, each data unit of the block is stored in a different memory bank of the N memory banks.

7. The data processing system of claim 6, further comprising one or more memory reading circuits configured to:
   read a row of the N×N data unit array by reading each data unit of the row from a different memory bank of the N memory banks;
   read a column of the N×N data unit array by reading each data unit of the column from a different memory bank of the N memory banks; and/or
   read a $\sqrt{N}$ data unit×$\sqrt{N}$ data unit block of the N×N data unit array by reading each data unit of the $\sqrt{N}\times\sqrt{N}$ block from a different memory bank of the N memory banks.

8. The data processing system of claim 6, wherein the data processing system is configured to de-activate one or more banks of the N memory banks during a read and/or write operation.

9. The data processing system of claim 6, further comprising a memory controller, wherein the memory controller is configured to store one or more N data unit×N data unit arrays of data in the memory such that:
- for each row of each N×N data unit array, each data unit of the row is stored in a different memory bank of the N memory banks; and
- for each column of each N×N data unit array, each data unit of the column is stored in a different memory bank of the N memory banks.

10. A non-transitory computer readable storage medium storing computer software code which when executing on a processor performs a method of operating a data processing system that comprises a memory comprising N memory banks wherein $N=n^2$, and wherein n is a positive integer greater than 1, the method comprising:
- storing one or more N data unit×N data unit arrays of data in the memory such that:
- for each row of each N×N data unit array, each data unit of the row is stored in a different memory bank of the N memory banks; and
- for each column of each N×N data unit array, each data unit of the column is stored in a different memory bank of the N memory banks;
- wherein each N×N data array comprises $\sqrt{N}$ rows of $\sqrt{N}$ data unit×$\sqrt{N}$ data unit blocks, and $\sqrt{N}$ columns of $\sqrt{N}$ data unit×$\sqrt{N}$ data unit blocks, and wherein the method comprises storing the one or more N data unit×N data unit arrays of data in the memory such that:
- for each $\sqrt{N}$ data unit×$\sqrt{N}$ data unit block of more than N overlapping $\sqrt{N}$ data unit×$\sqrt{N}$ data unit blocks of each N×N data array, each data unit of the block is stored in a different memory bank of the N memory banks.

* * * * *